D. A. CALKINS.
COMBINED RAKE AND TEDDER.
No. 173,895. Patented Feb. 22, 1876.
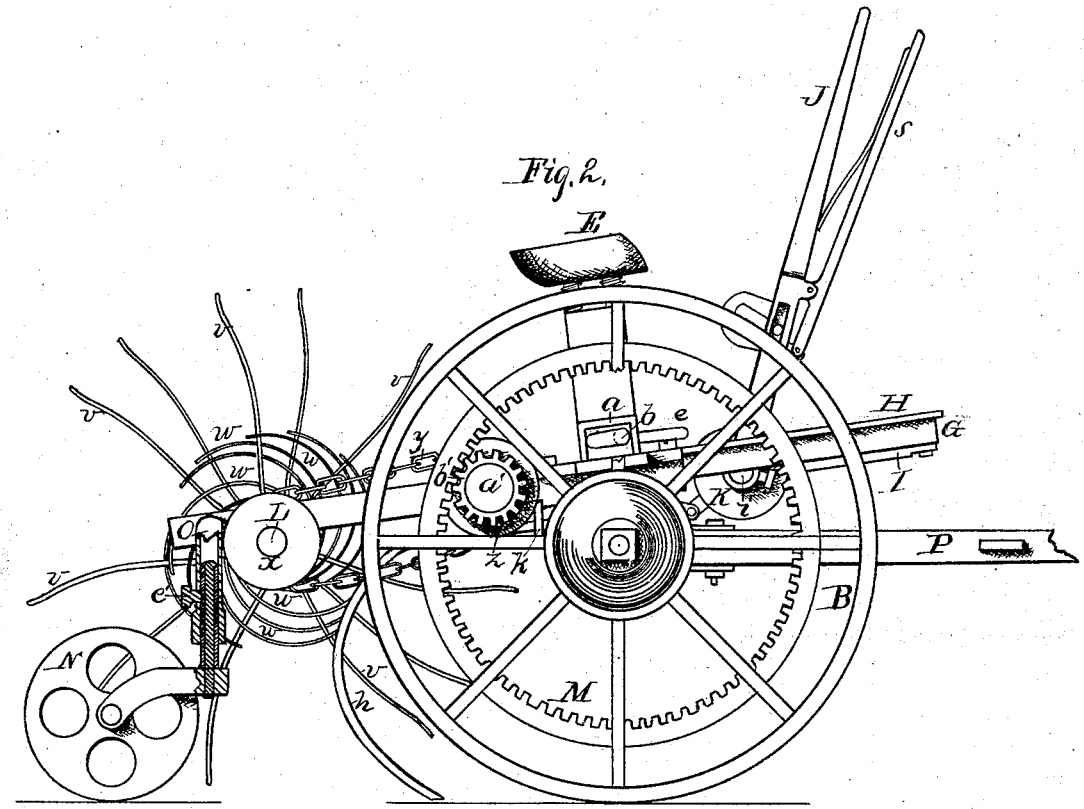
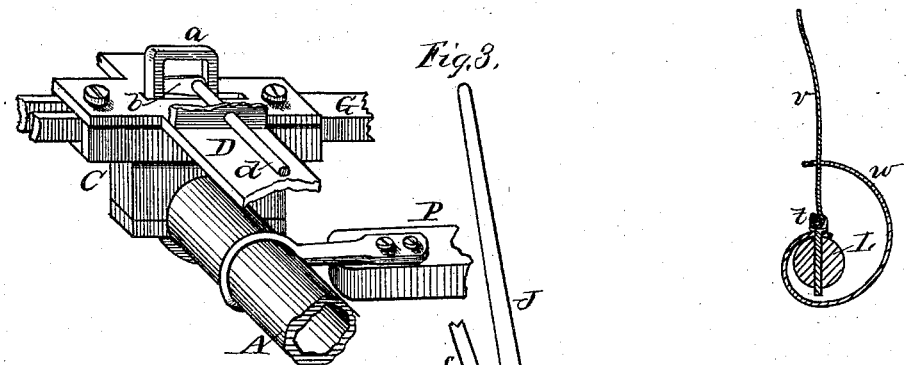
WITNESSES:
Jas. T. Duhamel.
Thomas Byrne,
INVENTOR:
D. A. Calkins.
Per H. S. Abbot.
Attorney.

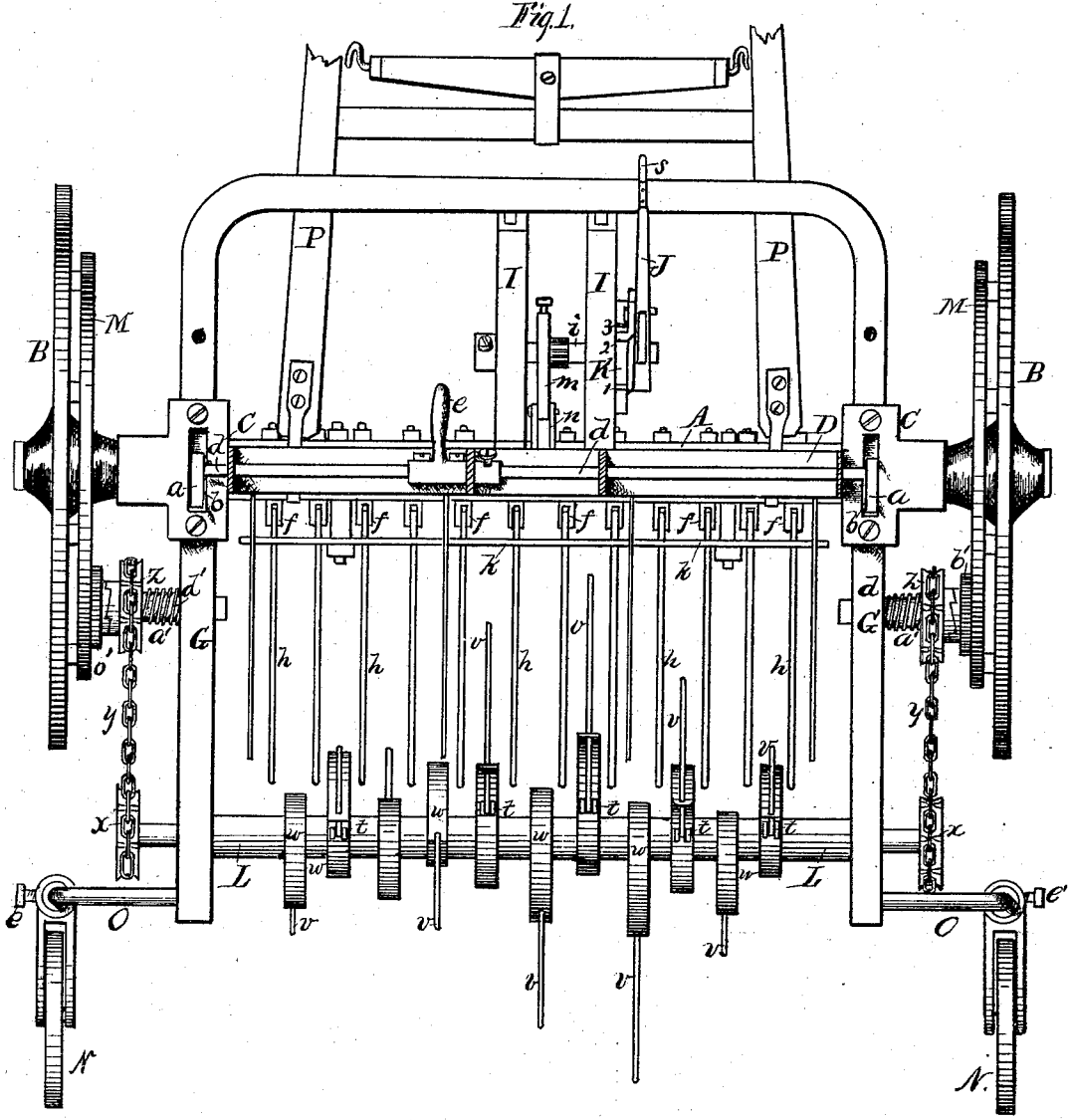

UNITED STATES PATENT OFFICE.

DICKERSON A. CALKINS, OF MONSON, MASSACHUSETTS.

IMPROVEMENT IN COMBINED RAKES AND TEDDERS.

Specification forming part of Letters Patent No. 173,895, dated February 22, 1876; application filed April 22, 1875.

*To all whom it may concern:*

Be it known that I, DICKERSON A. CALKINS, of Monson, county of Hampden and State of Massachusetts, have invented certain new and useful Improvements in Combined Hay Rake and Tedder, of which the following is a specification:

The nature of my invention consists in the construction and arrangement of a combined hay rake and tedder, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1 is a plan view of my invention. Fig. 2 is a side view. Fig. 3 shows detached parts.

A represents the axle of my machine, made hollow, and provided at each end with a spindle for the reception of the driving-wheel B. On the axle A, near each end, is placed a bearing or box, C, in which the axle revolves, the two boxes being connected by a bar, D, above and parallel with the axle, upon which the seat E is supported. Through the boxes C C, above and at right angles with the axle, are passed two sliding bars, G G, which are connected by and support a platform, H, at their front ends. The two bars G G may be made in one piece, bent to form a frame with two parallel side pieces, and support the platform H in front of the seat. The front part of the platform, or of the bar when made in one piece, is, on the under side, connected with the bar D by two parallel bars, I I, the front ends of which are slotted and fastened by screws through said slots, allowing the movement back and forth of the platform H and frame G. From the side bars of this frame extend staples $a\ a$ through slots in the top of the boxes C C, and in these staples work eccentrics $b\ b$, which project from the ends of a shaft, $d$, held in suitable bearings above and parallel with the bar D. This shaft is provided with a lever, $e$, by means of which it is turned to cause the eccentrics by operating in the staples to move the frame and platform back and forth a certain distance, the object being to throw the hay-tedder in and out of gear, as hereinafter described.

Through the axle A is passed a series of forked bolts, $f\ f$, fastened by nuts, and placed at suitable equal distances apart. In each of these forks is pivoted an ordinary rake-tooth, $h$, and all the teeth pass through transverse slots in a bar, $k$, fastened upon arms projecting from the axle.

In bearings formed in the bars I I, above described, is placed a short shaft, $i$, provided with an adjustable arm, $m$, which is by a link, $n$, connected with an arm, $p$, projecting from the top of the axle. On one end of the shaft $i$ is fastened a lever, J, which projects up through a slot in the platform H, and is provided with a spring-pawl, $s$, of suitable construction to take into a notched segment, K, also projecting through the slot in the platform. The segment K has three notches, 1, 2, and 3. When the lever J is held by its pawl in the rear notch 1, the rake-teeth are raised for dumping or other purposes. When the lever is held in the notch 2 the rake is held down for work, and the teeth are movable independent of each other; but when the lever is held in notch 3 the teeth are held rigidly to their work by the bar $k$ pressing on them.

At the rear end of the frame G, in suitable boxes on the under side thereof, is placed a shaft, L, into which are inserted a series of forked pins, $t\ t$. These pins are arranged in spiral form and at equal distances apart, and each pin secures a flat spring, $w$, to the shaft, which spring is coiled around the shaft, and has a hole in its outer end, through which the tedder-tooth $v$ is passed, said tooth being pivoted in the forked pin $t$. On each end of the shaft L, beyond the frame G, is secured a chain-wheel, $x$, which is connected by a chain, $y$, with a similar wheel, $z$, placed on a stud, $a'$, projecting from the frame G. On the outer end of this stud is placed a pinion, $b'$, which meshes with a cog-wheel, M, attached to the inner side of the driving-wheel B, when the frame G is moved backward, as above described. The chain-wheel $z$ and pinion $b'$ are connected by an ordinary clutch, held in gear by a spring, $d'$, pressing the chain-wheel outward.

If the machine, in turning or at other times, should turn backward, the clutch disengages itself, and the tedder does not revolve.

By moving the frame G forward by the lever e, shaft d, and eccentrics b b, as described, the pinions b' are thrown out of gear with the cog-wheels M, stopping the operation of the tedder. The rear end of the frame G, with the tedder, is supported upon two caster-wheels, N N, the stems of which are held in hollow L-shaped arms O O, projecting from the frame, and the stems are fastened therein by means of set-screws e'. By these means the wheels N may be adjusted so as to cause the tedder to work closer to or farther from the ground, as required.

P P represent the shafts, connected by means of clips directly to the axle-tree.

Having thus fully described my invention, what I claim as new, and desire to secure by Letters Patent, is—

1. In combination with the axle A and boxes C C placed thereon, the sliding frame G H, provided with the staples a a, and the shaft d, provided with the eccentrics b b, and lever e, substantially as and for the purposes herein set forth.

2. The combination of the revolving shaft L, forked pins t, flat springs w, and pivoted tedder-teeth v, substantially as and for the purposes herein set forth.

3. The combination, with the tedder-shaft L, of the chain-wheels x x, chains y y, chain-wheels z z, with springs d' d', and pinions b' b', all arranged on the movable frame G, so as to throw the pinions in and out of gear with the cog-wheels M on the driving-wheels B, substantially as herein set forth.

4. The combination, with the frame G, of the hollow arms O O and the caster-wheels N N, having their stems adjusted and held in said arms by the set-screws e', substantially as and for the purposes herein set forth.

In testimony that I claim the foregoing as my invention I hereunto affix my signature this 14th day of April, 1875.

DICKERSON A. CALKINS.

Witnesses:
IRA G. POTTER,
ARVILLA J. PECK.